Nov. 8, 1938.   J. A. SPENCER   2,135,856
METHOD OF MAKING FOOD PRODUCTS
Filed July 12, 1937.

John A. Spencer,
Inventor,
Delos F. Haynes,
Attorney.

Patented Nov. 8, 1938

2,135,856

UNITED STATES PATENT OFFICE 2,135,856

METHOD OF MAKING FOOD PRODUCTS

John A. Spencer, Newtonville, Mass.

Application July 12, 1937, Serial No. 153,142

3 Claims. (Cl. 99—65)

This invention relates to methods of making food products, and with regard to certain more specific features, to methods of making food products of the class which, when infused with water or the like, form a beverage, such as coffee or tea.

Among the several objects of the invention may be noted the provision of methods of making food products of the class described which have an improved taste and palatability, and which are adapted to produce infusions of greater strength for the amount of product used; the provision, more specifically, of methods of making an improved coffee in which the aroma is enhanced and other desirable flavor characteristics brought out, but in which the bitter constituents are suppressed, said coffee being adapted, upon infusion thereof with water, to produce a stronger coffee beverage from the same amount of coffee material; and the provision of methods of preparing food products of the class described which improve their flavor, aroma, and other desired characteristics. Other objects will be in part obvious and in part pointed out hereinafter.

The invention accordingly comprises the steps and sequence of steps, and features of treatment, which will be exemplified in the methods hereinafter described, and the scope of the application of which will be indicated in the following claims.

Figure 1:
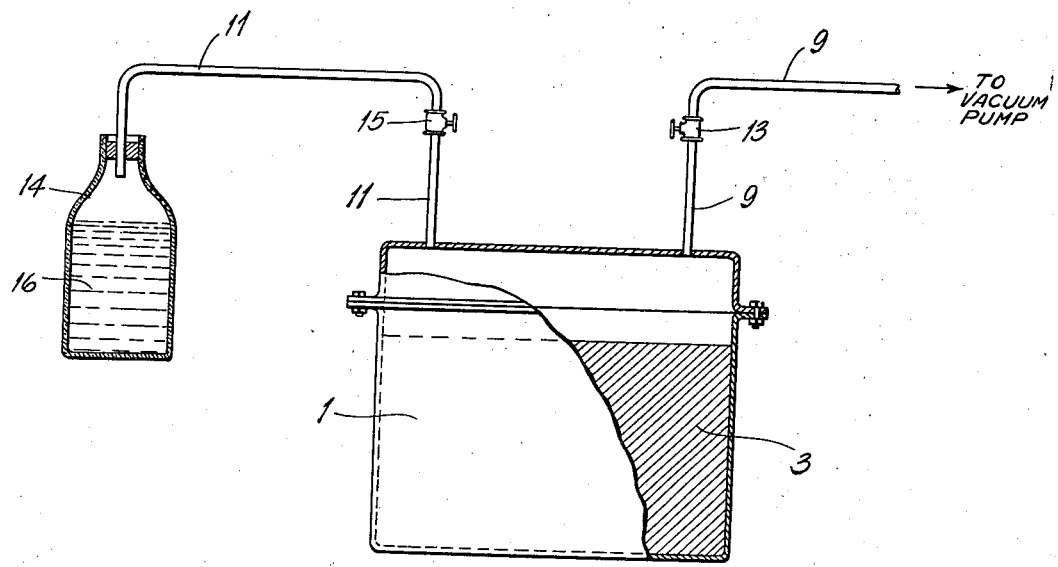
Figure 2:
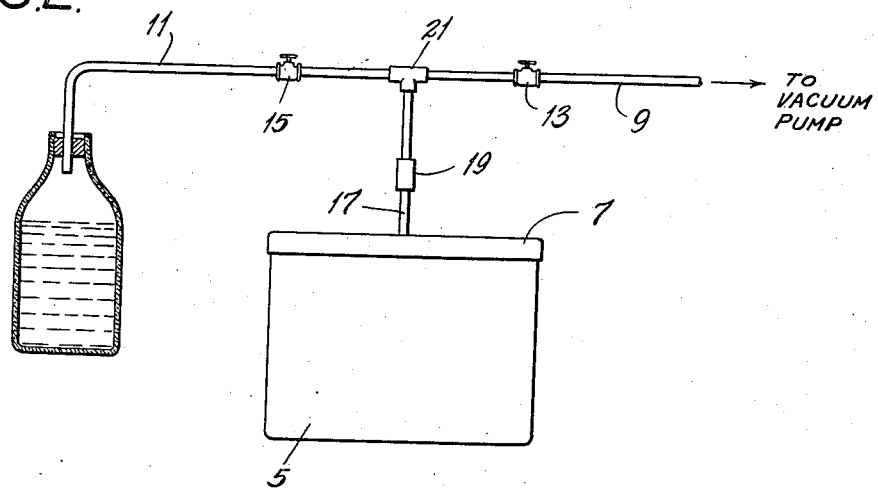

In the accompanying drawing, in which are illustrated several of various possible embodiments of apparatus for carrying out the methods of the invention, Fig. 1 is a diagrammatic sketch of apparatus used in carrying out the present invention; and Fig. 2 is a diagrammatic sketch of an alternative form of apparatus.

Similar reference characters indicate corresponding parts throughout the several views of the drawing.

Since the present invention has its chief application to coffee, it will be described hereinafter in detail with respect to coffee. However, the invention likewise applies to other beverage-producing materials, such as tea and the like, and it will be understood that such other materials can be treated to advantage in a similar manner to that set forth hereinafter for coffee.

Proceeding in accordance with the present invention, roasted, ground coffee beans (in the condition in which they are usually prepared for sale on the retail market), are placed in a container which may be hermetically sealed from the atmosphere. In carrying out the invention on a large scale, this container may comprise an autoclave-like device such as that indicated at numeral 1 in Fig. 1. The ground coffee is indicated by numeral 3 in Fig. 1. Or, in case the process is to be carried out on individual small packages, such as are used for selling the coffee at retail, the container may take the form of an ordinary can such as the one indicated at numeral 5 in Fig. 2. In Fig. 2, the lid 7 of the can 5 is shown as already hermetically sealed to the can 5, which is filled with ground coffee.

The lid of the autoclave 1, Fig. 1, is equipped with two connections 9 and 11, which are provided with valves 13 and 15, respectively. The connection 9 leads to a suitable vacuum pump. The connection 11 leads to a container 14, in which is placed alcohol or an alcoholic liquid, indicated at numeral 16.

In the alternative form of apparatus indicated in Fig. 2, a short length of tubing 17 is sealed to the lid 7 of the container, and the tubing 17 is connected by a removable coupling 19 to a T connection 21. One end of the T connection is in turn connected to the valve 13 and line 9 leading to the vacuum pump, while the other end of the T connection is connected to the valve 15 and line 11 leading to the container 14. It will be seen that the general piping arrangement of Fig. 2 is analogous to that of Fig. 1.

Proceeding with the carrying out of the invention, in the case of either apparatus embodiment, the valve 15 is first closed, and the valve 13 opened, and the vacuum pump set into operation. In this manner, the coffee in the container, as well as the container itself, is evacuated of air to a high degree. The degree of evacuation may be further enhanced by heating the coffee in the container by any suitable means. At present, the preferred extent of evacuation appears to be to reduce the absolute pressure within the evacuated part of the system to the order of say, three or four pounds per square inch. When such a degree of vacuum is obtained, the valve 13 is closed and the valve 15 opened. This permits the pressure in the coffee container to rise, by reason of the admission of the vapor of alcohol thereto from the container 14. Ordinarily the admission of vapor from the container 14 is permitted to go on until the absolute pressure in the coffee container rises to, say, the order of ten or eleven pounds per square inch. After such a pressure has been achieved, the valve 15 is closed and the coffee has been completely treated and is ready for disposition. In the case of the embodiment of Fig. 1, this means that the lid of the autoclave is removed and the coffee is placed in individual containers, which may then in turn be sealed. Preferably the coffee is exposed as little to the air as possible after it has once been treated. The ultimate packaging of the coffee may take place with the inclusion in the container, instead of air, of an inert gas, such as is the custom in numerous methods of packaging coffee today.

If the individual container embodiment of Fig. 2 has been used, at the completion of the processing the small tube 17 is sealed off, as by applying a welding torch or some similar means to said tube. The coffee in the container 5 is thus automatically maintained in a hermetically sealed atmosphere still containing a portion of the alcohol vapor.

The coffee so treated may be used in any of the well known manners, for example, it may be prepared in beverage form by heating it with water in the usual coffee pot, or by percolating or the drip process.

Coffee infusions for beverages made from coffee processed in accordance with the present invention, do not appear to be distinctly flavored with the alcoholic material. This is easily explained because the heat used in making the beverage apparently drives off whatever alcohol might be in the coffee. It is believed, however, that the action of the alcohol in the processing is to release the true flavor of the coffee bean which is not otherwise obtained. It is notable that an infusion of coffee made from coffee processed in accordance with the present invention is much stronger, from the same relative amount of coffee grounds, than is the coffee infusion produced from a comparable amount of coffee not processed according to the present invention.

It is believed that one result of the treatment with alcohol vapors is that the coffee grounds are made more soluble in water by the permeation with the alcohol vapors. The bitterness principles of the coffee bean are also apparently suppressed by the treatment with alcohol vapors; at least, the coffee infusions made from coffee processed in accordance with the present invention are free of such bitterness. It may be that water vapor normally present in the bean particles is removed to some extent during the evacuation step, and then replaced with alcoholic vapors during the treatment step.

It is also believed that something in the nature of a chemical reaction goes on between the alcohol vapors and certain of the constituents of the coffee. For example, the acids present in the coffee (such as caffeic and tannic acids) may be esterified, and the esters formed may be more beneficial to the flavor of the ultimate coffee infusion. The coffee oil present in the roasted coffee probably forms a tincture or solution with the alcohol, which tincture or solution is later re-absorbed into the coffee grounds and ultimately, in the process of making the coffee drink, is more soluble in water than was the original coffee oil.

It is frequently desirable, as a final step in the treatment of coffee according to the present invention, to raise the absolute pressure at least briefly within the container in order to drive back into the substance of the coffee grounds any oils, liquids, and the like that may have been brought to the surface of the grounds by the previous vacuum treatment. This may be done, for example, by merely heating the sealed container for a brief interval to a temperature, say, of the order of 200° F.

The preferred form of alcoholic liquid for use in the container 14 is a brandy or cognac, as this appears to produce a finished coffee of most desirable flavor and aroma. Other alcoholic liquids or spirituous liquors, can, however, be substituted for the brandy or cognac with very beneficial results.

An alternative method of processing the coffee in accordance with the present invention comprises leaving the valve 15 between the coffee container and the alcoholic liquid container partway open during the evacuation process, under which conditions vaporization of the alcoholic liquid occurs when a low pressure is reached in the system, and the coffee container, already rid of a large part of air and water vapor, is permeated with alcohol vapors which penetrate the bean particles. A more vigorous vaporization of the alcoholic liquid can be obtained by warming the container 14 with any suitable heating means.

Tea may be processed in accordance with the present invention in almost identically the same manner as coffee, with a consequent improvement in the palatability of the tea, as well as its flavor and aroma.

Products made in accordance with the methods set forth herein are claimed in my copending patent application, Serial No. 232,322, filed September 29, 1938.

In view of the above, it will be seen that the several objects of the invention are achieved and other advantageous results attained.

As many changes could be made in carrying out the above methods without departing from the scope of the invention, it is intended that all matter contained in the above description shall be interpreted as illustrative and not in a limiting sense.

I claim:

1. The method of improving food products of the class adapted to make beverages by infusion, which comprises treating said food products with alcoholic vapors under a condition of partial vacuum.

2. The method of improving coffee, which comprises placing said coffee, in its roasted, ground condition, in a container, substantially evacuating said container, and admitting alcoholic vapors to the evacuated container.

3. The method of improving coffee, which comprises placing said coffee, in roasted, ground condition, in a container, evacuating said container to an absolute pressure of three to four pounds per square inch, and then admitting alcoholic vapors to said container until the absolute pressure rises to the order of ten to eleven pounds per square inch.

JOHN A. SPENCER.